US007684885B2

(12) United States Patent
Woolfork

(10) Patent No.: US 7,684,885 B2
(45) Date of Patent: Mar. 23, 2010

(54) WIRELESS DIGITAL AUDIO SYSTEM

(75) Inventor: C. Earl Woolfork, Pasadena, CA (US)

(73) Assignee: One-E-Way, Inc., Pasadena, CA (US)

(*) Notice: Subject to any disclaimer, the term of this patent is extended or adjusted under 35 U.S.C. 154(b) by 0 days.

(21) Appl. No.: 12/144,729

(22) Filed: Jul. 12, 2008

(65) Prior Publication Data

US 2008/0279390 A1 Nov. 13, 2008

(51) Int. Cl.
*G06F 17/00* (2006.01)
*H04H 40/00* (2008.01)

(52) U.S. Cl. ........................................ 700/94; 455/3.06

(58) Field of Classification Search ....................... None
See application file for complete search history.

(56) References Cited

U.S. PATENT DOCUMENTS 5,771,441 A * 6/1998 Altstatt ...................... 455/66.1
5,781,542 A * 7/1998 Tanaka et al. ............... 370/342
6,678,892 B1 * 1/2004 Lavelle et al. ................. 725/75
6,781,977 B1 * 8/2004 Li .............................. 370/335

* cited by examiner

*Primary Examiner*—Andrew C Flanders
(74) *Attorney, Agent, or Firm*—Megan E Lyman

(57) ABSTRACT

A wireless digital audio system includes a portable audio source with a digital audio transmitter operatively coupled thereto and an audio receiver operatively coupled to a headphone set. The audio receiver is configured for digital wireless communication with the audio transmitter. The digital audio receiver utilizes fuzzy logic to optimize digital signal processing. Each of the digital audio transmitter and receiver is configured for code division multiple access (CDMA) communication. The wireless digital audio system allows private audio enjoyment without interference from other users of independent wireless digital transmitters and receivers sharing the same space.

20 Claims, 3 Drawing Sheets

WIRELESS DIGITAL AUDIO SYSTEM

This continuation application claims the benefit of U.S. patent application Ser. No. 10/648,012 filed Aug. 26, 2003, which claimed benefit from U.S. patent application Ser. No. 10/027,391, filed Dec. 21, 2001, for "Wireless Digital Audio System," published under US 2003/0118196 A1 on Jun. 26, 2003, now abandoned, both of which are incorporated herein in their entirety by reference.

BACKGROUND OF THE INVENTION

This invention relates to audio player devices and more particularly to systems that include headphone listening devices. The new audio system uses an existing headphone jack (i.e., this is the standard analog headphone jack that connects to wired headphones) of a music audio player (i.e., portable CD player, portable cassette player, portable A.M./F.M. radio, laptop/desktop computer, portable MP3 player, and the like) to connect a battery powered transmitter for wireless transmission of a signal to a set of battery powered receiving headphones.

Use of audio headphones with audio player devices such as portable CD players, portable cassette players, portable A.M./F.M. radios, laptop/desktop computers, portable MP3 players and the like have been in use for many years. These systems incorporate an audio source having an analog headphone jack to which headphones may be connected by wire. The audio source of the present invention may be portable (i.e., easily carried or transported). Thus, the present invention may easily be employed while the user is running, walking, cycling, swimming, or in motion by virtue of attachment to a personal moving device.

There are also known wireless headphones that may receive A.M. and F.M. radio transmissions. However, they do not allow use of a simple plug in (i.e., plug in to the existing analog audio headphone jack) battery powered transmitter for connection to any music audio player device jack, such as the above mentioned music audio player devices, for coded wireless transmission and reception by headphones of audio music for private listening without interference where multiple users occupying the same space are operating wireless transmission devices. Existing audio systems make use of electrical wire connections between the audio source and the headphones to accomplish private listening to multiple users.

There is a need for a battery powered simple connection system for existing music audio player devices (i.e., the previously mentioned music devices), to allow coded digital wireless transmission (using a battery powered transmitter) to a headphone receiver (using a battery powered receiver headphones) that accomplishes private listening to multiple users occupying the same space without the use of wires.

SUMMARY OF THE INVENTION

The present invention is generally directed to a wireless digital audio system for coded digital transmission of an audio signal from any audio player with an analog headphone jack to a receiver headphone located away from the audio player. Fuzzy logic technology may be utilized by the system to enhance bit detection. A battery-powered digital transmitter may include a headphone plug in communication with any suitable music audio source. For reception, a battery-powered headphone receiver may use embedded fuzzy logic to enhance user code bit detection. Fuzzy logic detection may be used to enhance user code bit detection during decoding of the transmitted audio signal. The wireless digital audio music system provides private listening without interference from other users or wireless devices and without the use of conventional cable connections.

These and other features, aspects and advantages of the present invention will become better understood with reference to the following drawings, description and claims.

BRIEF DESCRIPTION OF THE DRAWINGS

Some aspects of the present invention are generally shown by way of reference to the accompanying drawings in which.

DETAILED DESCRIPTION

The following detailed description is the best currently contemplated modes for carrying out the invention. The description is not to be taken in a limiting sense, but is made merely for the purpose of illustrating the general principles of the invention.

Figure 1:
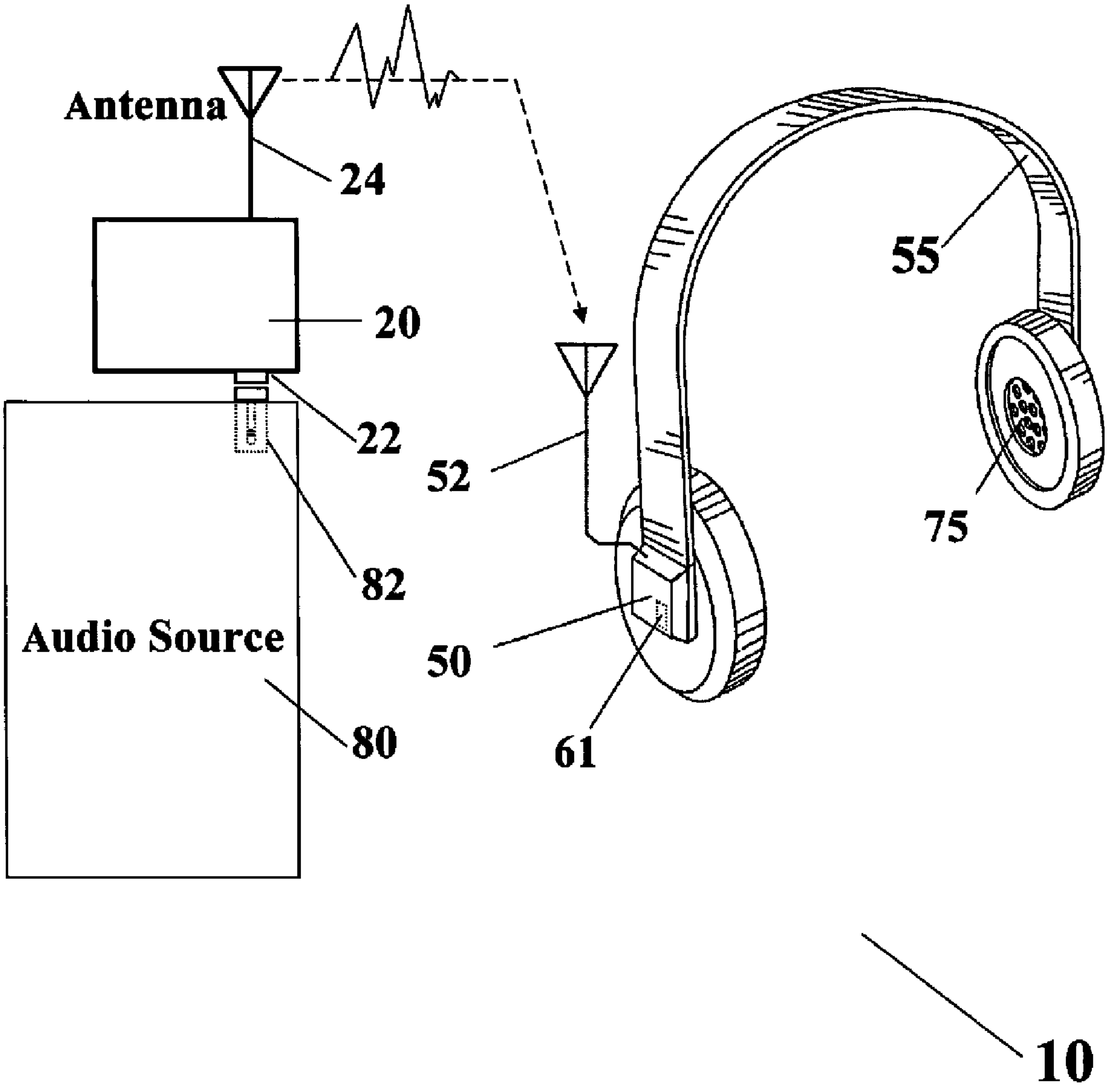
FIG. 1 schematically illustrates a wireless digital audio system in accordance with the present invention.
Figure 2:
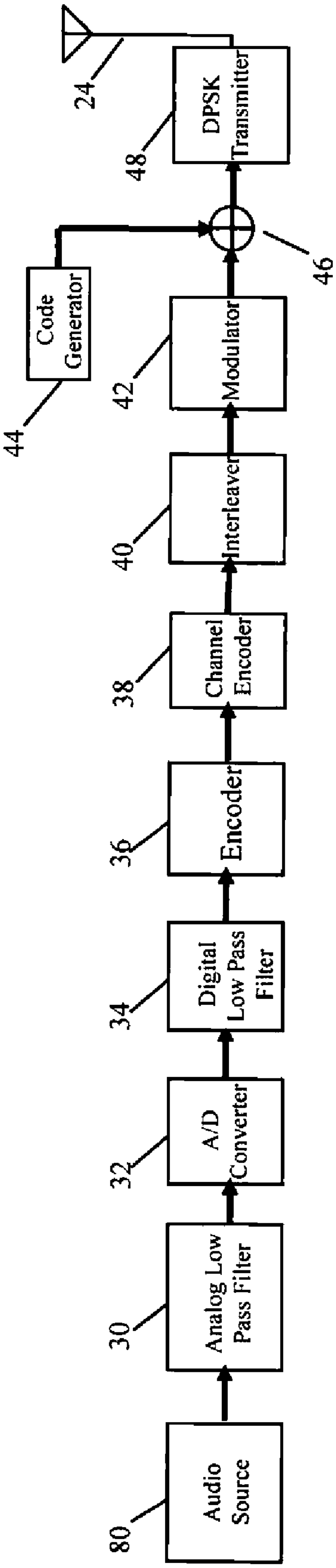
FIG. 2 is a block diagram of an audio transmitter portion of the wireless digital audio system of FIG. 1.
Figure 3:
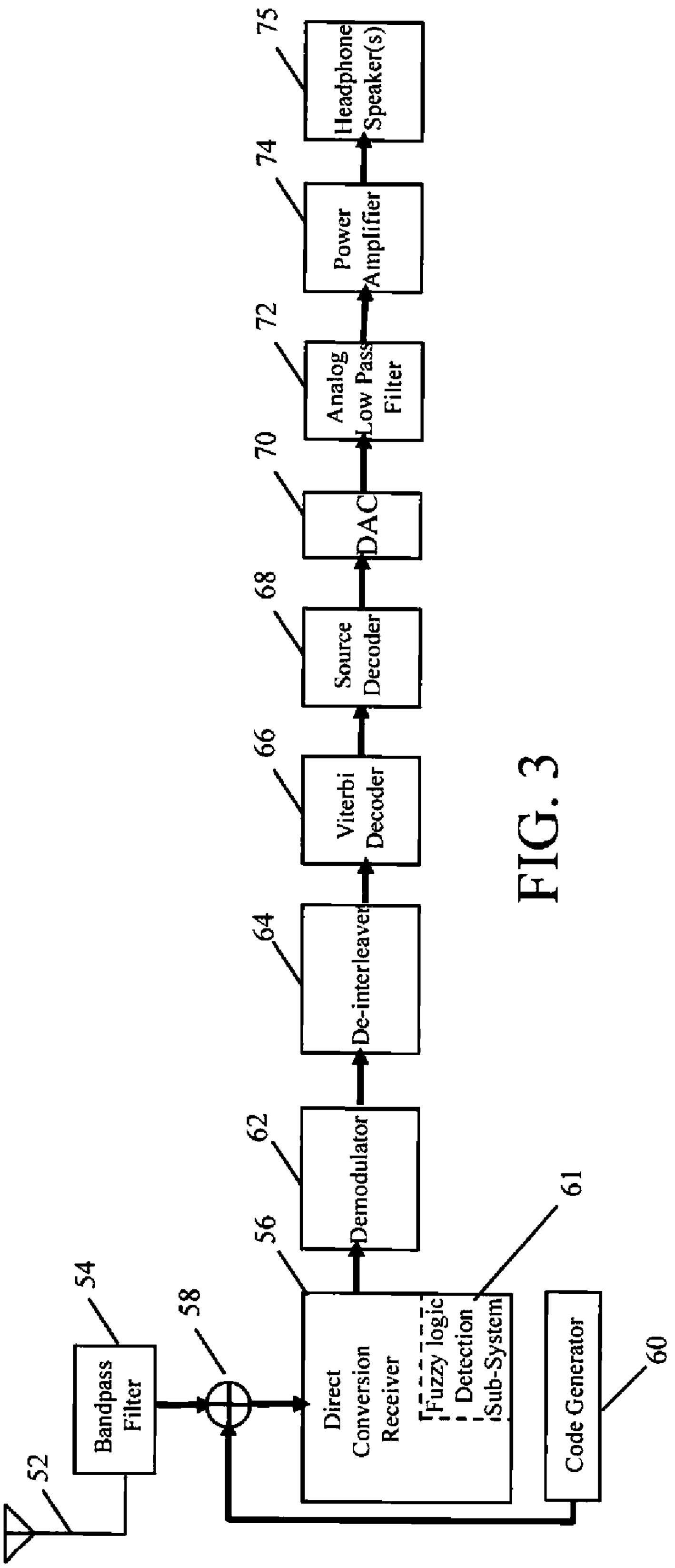
FIG. 3 is a block diagram of an audio receiver portion of the wireless digital audio system of FIG. 1.

Referring to FIGS. 1 through 3, a wireless digital audio music system 10 may include a battery powered transmitter 20 connected to a portable music audio player or music audio source 80. The battery powered wireless digital audio music transmitter 20 utilizes an analog to digital converter or ADC 32 and may be connected to the music audio source 80 analog headphone jack 82 using a headphone plug 22. The battery powered transmitter 20 may have a transmitting antenna 24 that may be omni-directional for transmitting a spread spectrum modulated signal to a receiving antenna 52 of a battery powered headphone receiver 50. The battery powered receiver 50 may have headphone speakers 75 in headphones 55 for listening to the spread spectrum demodulated and decoded communication signal. In the headphone receiver 50, fuzzy logic detection may be used to optimize reception of the received user code. The transmitter 20 may digitize the audio signal using ADC 32. The digitized signal may be processed downstream by an encoder 36. After digital conversion, the digital signal may be processed by a digital low pass filter. To reduce the effects of channel noise, the battery powered transmitter 20 may use a channel encoder 38. A modulator 42 modulates the digital signal to be transmitted. For further noise immunity, a spread spectrum DPSK (differential phase shift key) transmitter or module 48, is utilized. The battery powered transmitter 20 may contain a code generator 44 that may be used to create a unique user code. The unique user code generated is specifically associated with one wireless digital audio system user, and it is the only code recognized by the battery powered headphone receiver 50 operated by a particular user. The radio frequency (RF) spectrum utilized (as taken from the Industrial, Scientific and Medical (ISM) band) may be approximately 2.4 GHz. The power radiated by the transmitter adheres to the ISM standard.

Particularly, the received spread spectrum signal may be communicated to a 2.4 GHz direct conversion receiver or module 56. Referring to FIGS. 1 through 4, the spread spectrum modulated signal from transmit antenna 24 may be received by receiving antenna 52 and then processed by spread spectrum direct conversion receiver or module 56 with a receiver code generator 60 that contains the same transmitted unique code, in the battery powered receiver 50 headphones. The transmitted signal from antenna 24 may be received by receiving antenna 52 and communicated to a wideband bandpass filter (BPF). The battery powered receiver 50 may utilize embedded fuzzy logic 61 (as graphically depicted in FIGS. 1, 4) to optimize the bit detection of the received user code. The down converted output signal of direct conversion receiver or module 56 may be summed by receiver summing element 58 with a receiver code generator 60 signal. The receiver code generator 60 may contain the same unique wireless transmission of a signal code word that was transmitted by audio transmitter 20 specific to a particular user. Other code words from wireless digital audio systems 10 may appear as noise to audio receiver 50. This may also be true for other device transmitted wireless signals operating in the wireless digital audio spectrum of digital audio system 10. This code division multiple access (CDMA) may be used to provide each user independent audible enjoyment. The resulting summed digital signal from receiving summary element 58 and direct conversion receiver or module 56 may be processed by a 64-Ary demodulator 62 to demodulate the signal elements modulated in the audio transmitter 20. A block de-interleaver 64 may then decode the bits of the digital signal encoded in the block interleaver 40. Following such, a Viterbi decoder 66 may be used to decode the bits encoded by the channel encoder 38 in audio transmitter 20. A source decoder 68 may further decode the coding applied by encoder 36.

Each receiver headphone 50 user may be able to listen (privately) to high fidelity audio music, using any of the audio devices listed previously, without the use of wires, and without interference from any other receiver headphone 50 user, even when operated within a shared space. The fuzzy logic detection technique 61 used in the receiver 50 could provide greater user separation through optimizing code division in the headphone receiver.

The battery powered transmitter 20 sends the audio music information to the battery powered receiver 50 in digital packet format. These packets may flow to create a digital bit stream rate less than or equal to 1.0 Mbps.

The user code bits in each packet may be received and detected by a fuzzy logic detection sub-system 61 (as an option) embedded in the headphone receiver 50 to optimize audio receiver performance. For each consecutive packet received, the fuzzy logic detection sub-system 61 may compute a conditional density with respect to the context and fuzziness of the user code vector, i.e., the received code bits in each packet. Fuzziness may describe the ambiguity of the high (1)/low (0 or −1) event in the received user code within the packet. The fuzzy logic detection sub-system 61 may measure the degree to which a high/low bit occurs in the user code vector, which produces a low probability of bit error in the presence of noise. The fuzzy logic detection sub-system 61 may use a set of if-then rules to map the user code bit inputs to validation outputs. These rules may be developed as if-then statements.

Figure 4:
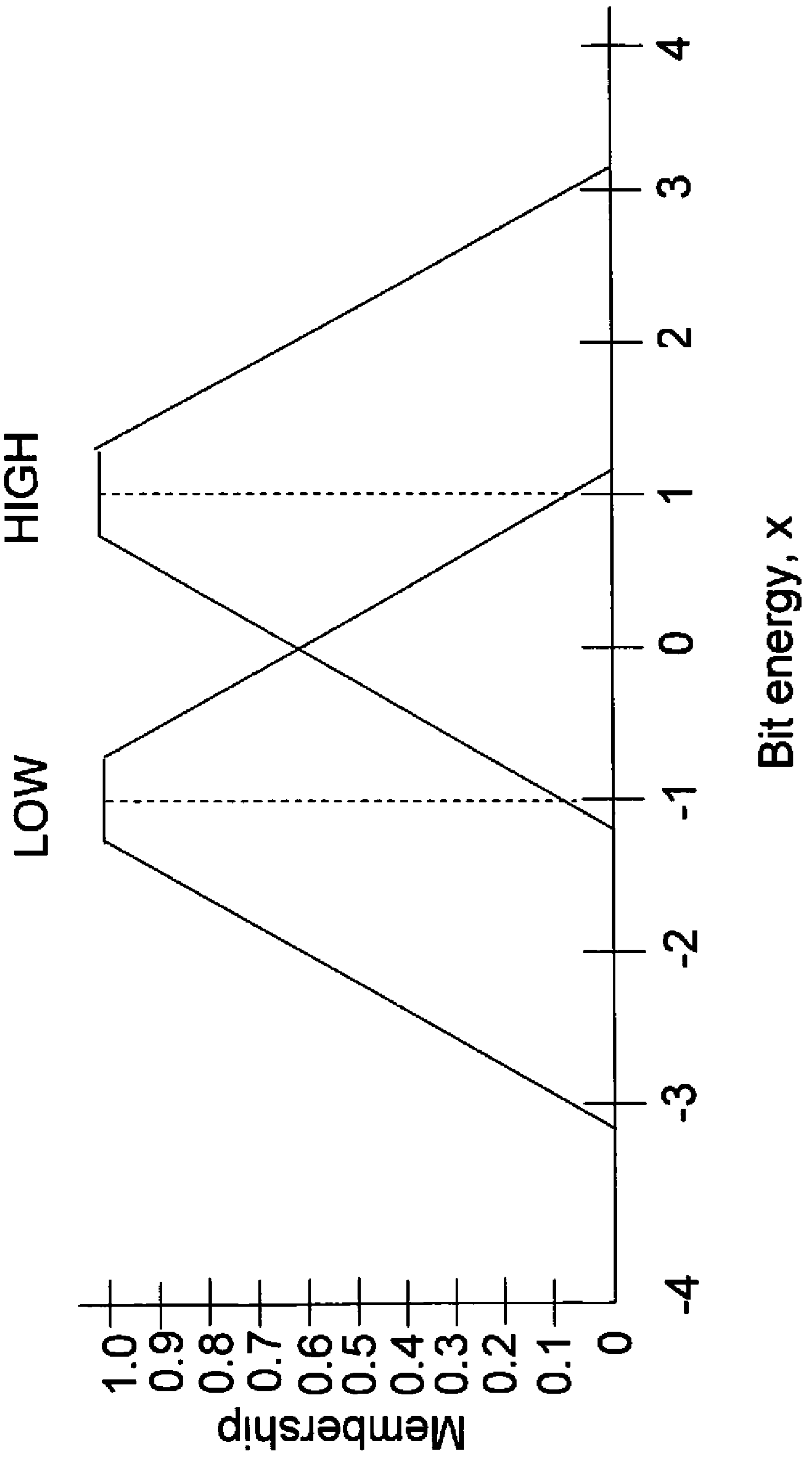
FIG. 4 is an exemplary graph showing the utilization of an embedded fuzzy logic coding algorithm according to one embodiment of the present invention.

Fuzzy logic detection sub-system 61 in battery-powered headphone receiver 50 utilizes the if-then fuzzy set to map the received user code bits into two values: a low (0 or −1) and a high (1). Thus, as the user code bits are received, the “if” rules map the signal bit energy to the fuzzy set low value to some degree and to the fuzzy set high value to some degree. FIG. 4 graphically shows that x-value −1 equals the maximum low bit energy representation and x-value 1 equals the maximum high bit energy representation. Due to additive noise, the user code bit energy may have some membership to a low and high as represented in FIG. 4. The if-part fuzzy set may determine if each bit in the user code, for every received packet, has a greater membership to a high bit representation or a low bit representation. The more a user code bit energy fits into the high or low representation, the closer its subsethood, i.e., a measure of the membership degree to which a set may be a subset of another set, may be to one.

The if-then rule parts that make up the fuzzy logic detection sub-system 61 must be followed by a defuzzifying operation. This operation reduces the aforementioned fuzzy set to a bit energy representation (i.e., −1 or 1) that is received by the transmitted packet. Fuzzy logic detection sub-system 61 may be used in battery-powered headphone receiver 50 to enhance overall system performance.

The next step may process the digital signal to return the signal to analog or base band format for use in powering speaker(s) 75. A digital-to-analog converter 70 (DAC) may be used to transform the digital signal to an analog audio signal. An analog low pass filter 72 may be used to filter the analog audio music signal to pass a signal in the approximate 20 Hz to 20 kHz frequency range and filter other frequencies. The analog audio music signal may then be processed by a power amplifier 74 that may be optimized for powering headphone speakers 75 to provide a high quality, low distortion audio music for audible enjoyment by a user wearing headphones 55. A person skilled in the art would appreciate that some of the embodiments described hereinabove are merely illustrative of the general principles of the present invention. Other modifications or variations may be employed that are within the scope of the invention. Thus, by way of example, but not of limitation, alternative configurations may be utilized in accordance with the teachings herein. Accordingly, the drawings and description are illustrative and not meant to be a limitation thereof.

Moreover, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced. Thus, it is intended that the invention cover all embodiments and variations thereof as long as such embodiments and variations come within the scope of the appended claims and their equivalents.

I claim:

1. A method for wireless digital audio transmission and reception of at least one audio source between at least one digital portable audio transmitter and at least one portable audio receiver comprising the steps of:

operatively coupling the digital portable audio transmitter to said at least one audio source, the digital portable audio transmitter comprising:

a first analog low pass filter receiving audio output from said at least one audio source;

a digital low pass filter;

an analog-to-digital converter (ADC) operatively coupled between the first analog and the digital low pass filter;

a first encoder receiving output from the digital low pass filter and being configured to reduce intersymbol interference (ISI);

a second channel encoder operatively coupled to the first encoder and adapted to reduce transmission errors;

a digital modulator operatively coupled to the second channel encoder; and a differential phase shift key (DPSK) module receiving output from the digital modulator and a unique user code and being configured for direct sequence spread spectrum (DSSS) communication, said DPSK module transmitting a corresponding DSSS signal;

converting the audio output to a digital communication signal;

encoding the digital communication signal;

filtering the digital communication signal;

creating the DSSS signal;

transmitting the DSSS signal to said at least one portable audio receiver configured for digital wireless communication from said at least one portable digital audio transmitter and utilizing an embedded fuzzy logic detector wherein the fuzzy logic detector activates fuzzy logic rules and performs a defuzzification operation in response to a received user code in said transmitted DSSS signal, said at least one portable audio receiver comprising:

a band pass filter (BPF) configured to process said transmitted DSSS signal;

a direct conversion module to receive output from said BPF and being configured to capture the correct bit sequence embedded in said processed DSSS signal;

a digital demodulator adapted to process output from said direct conversion module;

a Viterbi decoder operatively coupled to said digital demodulator to generate a corresponding digital output;

a source decoder to process said digital output from said Viterbi decoder and being configured to decode the digital signal encoded by said first encoder;

a second analog low pass filter; and a digital-to-analog converter (DAC) operatively coupled between said source decoder and said second analog low pass filter, said second analog low pass filter to generate the audio output; and at least one module adapted to reproduce said amplified audio output, if the unique user code is recognized;

receiving said DSSS signal at said at least one portable audio receiver;

demodulating said DSSS signal;

demodulating said digital communication signal;

filtering said digital communication signal;

channel decoding said digital communication signal;

converting said digital communication signal to an audio output; and communicating the audio output to said at least one portable audio receiver, said audio output having been wirelessly transmitted from said at least one audio source to a user privately without interference from other users or wireless devices when operated in a shared space containing at least one other users of wireless devices utilizing code division multiple access (CDMA) communication.

2. The method for wireless digital audio transmission and reception of an audio output of claim 1, wherein said BPF is a wideband BPF.

3. The method for wireless digital audio transmission and reception of an audio output of claim 1, wherein said modulator is a 64-Ary modulator.

4. The method for wireless digital audio transmission and reception of an audio output of claim 1, wherein said demodulator is a 64-Ary demodulator.

5. The method for wireless digital audio transmission and reception of an audio output of claim 1, wherein said generated audio output is in the approximate range of 20 Hz to 20 kHz.

6. The method for wireless digital audio transmission and reception of an audio output of claim 1, wherein said spread spectrum signal is transmitted at about 2.4 GHz via an omnidirectional antenna.

7. The method for wireless digital audio transmission and reception of an audio output of claim 6, wherein said spread spectrum signal is transmitted at a power of about 100 milliwatts or less.

8. The method for wireless digital audio transmission and reception of an audio output of claim 1, wherein said ADC is a 4-bit analog-to-digital converter.

9. The method for wireless digital audio transmission and reception of an audio output of claim 1, wherein said BPF is operatively coupled to at least one antenna configured to receive said transmitted DSSS signal.

10. The method for wireless digital audio transmission and reception of an audio output of claim 1, wherein a user employing said method is running, walking, cycling, swimming, or in motion by virtue of attachment to a personal moving device.

11. A wireless digital audio system, comprising:

an audio source to provide an audio signal, said audio source having an existing analog headphone jack;

a portable transmitter coupled to said audio source via said analog headphone jack and operative to transmit a code division multiple access (CDMA) communication signal having said audio signal representative of said audio signal and adding a unique user code associated with only said audio signal provided by said audio source; and an audio receiver operative to receive the CDMA communication signal and utilizing an embedded fuzzy logic detector wherein the fuzzy logic detector activates fuzzy logic rules and performs a defuzzification operation in response to the received unique user code to enhance detection of the unique user code wherein if the unique user code is recognized, the transmitted audio signal is reproduced, providing a user of said portable transmitter and said audio receiver with private audio reproduction of said audio signal provided by said audio source free from interference when operated in a shared space containing at least one other user of wireless devices utilizing code division multiple access (CDMA) communication and utilizing an independent portable transmitter and audio receiver.

12. A wireless digital audio system, comprising:

an audio source to provide an audio signal, said audio source having an existing analog headphone jack;

a portable transmitter configured to couple to said audio source via said analog headphone jack and operative to transmit a code division multiple access (CDMA) communication signal having a differential phase shift keying (DPSK) modulated signal of said audio signal and adding a unique user code associated with only said audio signal provided by said audio source; and an audio receiver operative to receive the CDMA communication signal and utilizing an embedded fuzzy logic detector wherein the fuzzy logic detector activates fuzzy logic rules and performs a defuzzification operation in response to the received unique user code that to enhance detection of the unique user code wherein if the unique user code is recognized, the transmitted audio signal is reproduced, providing a user of said portable transmitter and said audio receiver with private audio reproduction of said audio signal provided by said audio source virtually free from interference when operated in a shared space containing at least one other user of wireless devices utilizing code division multiple access (CDMA) communication and utilizing an independent portable transmitter and audio receiver in a shared space.

13. The wireless digital audio system of claim 11, wherein said at least one audio source provides analog output in the approximate range of 20 Hz to 20 kHz.

14. The wireless digital audio system of claim 12, wherein said at least one audio source provides analog output in the approximate range of 20 Hz to 20 kHz.

15. A wireless digital audio receiver comprising:

an embedded fuzzy logic detector wherein the fuzzy logic detector activates fuzzy logic rules and performs a defuzzification operation in response to a received unique user code to enhance detection of the unique user code;

a band pass filter (BPF) configured to process a transmitted DSSS signal;

a direct conversion module receiving output from said BPF and being configured to capture the correct unique user code bit sequence embedded in the received DSSS signal;

a digital demodulator adapted to process output from said direct conversion module;

a Viterbi decoder operatively coupled to said digital demodulator and generating a corresponding digital output;

a source decoder receiving said digital output from said Viterbi decoder and being configured to decode the digital signal encoded therein;

an analog low pass filter; and a digital-to-analog converter (DAC), operatively coupled between said source decoder and said analog low pass filter, said analog low pass filter generating an audio output wherein if the unique user code bit sequence corresponding to the decoded and converted digital signal is recognized, said audio output having been wirelessly transmitted, said audio output reproduced without interference when operated in a shared space containing at least one other user of a wireless device utilizing code division multiple access (CDMA) communication.

16. A method for listening to an audio output with a wireless digital audio system while running comprising the steps of:

activating said wireless digital audio system while running, said wireless digital audio system, comprising:

a portable transmitter configured to couple to an audio source via said analog headphone jack and operative to transmit a code division multiple access (CDMA) communication signal having a differential phase shift keying (DPSK) modulated signal of an audio output and adding a unique user code to maintain fidelity of said audio output; and an audio receiver operative to receive the CDMA communication signal and utilizing an embedded fuzzy logic detector wherein the fuzzy logic detector activates fuzzy logic rules and performs a defuzzification operation in response to the received unique user code that to enhance detection of the unique user code, wherein if the unique user code is recognized, the transmitted audio signal is reproduced, providing a user of said portable transmitter and said audio receiver with private audio reproduction of said audio signal virtually free from interference when operated in a shared space containing at least one other user of a wireless device utilizing an independent portable transmitter and audio receiver; and listening to said audio output free from interference from at least one other user of a wireless devices in a shared space.

17. A wireless digital audio system, comprising:

an audio source to provide an audio signal representative of music;

a portable digital audio transmitter configured to coupled to said audio source, said portable digital audio transmitter comprising:

a digital modulator module configured for code division multiple access (CDMA) communication, said digital modulator module transmitting a corresponding CDMA signal with a unique user code;

said portable digital audio transmitter configured for digital wireless communication with at least one digital audio receiver, said digital audio receiver comprising:

an embedded fuzzy logic detector wherein the fuzzy logic detector activates fuzzy logic rules and performs a defuzzification operation in response to the received unique user code to enhance detection of the unique user code:

a digital-to-analog converter (DAC) generating an audio output; and at least one module adapted to reproduce said generated audio output, said audio having been wirelessly transmitted from said audio source free from interference from multiple CDMA transmission sources and other device transmitted signals operating in the wireless digital audio system spectrum to a user providing a particular audio receiver headphone user with independent audio in a shared space with other wireless digital audio system users, wherein each of said wireless digital audio system users utilize an independent transmitter and headphone receiver.

18. A wireless digital audio system, comprising:

at least one audio source;

at least one digital audio transmitter operatively coupled to said at least one audio source, said at least one audio transmitter comprising:

a first encoder configured to reduce intersymbol interference (ISI);

a second channel encoder operatively coupled to the first encoder and adapted to reduce transmission errors;

a digital modulator operatively coupled to said second channel encoder; and a unique user code and being configured for direct sequence spread spectrum (DSSS) communication;

at least one audio receiver configured for digital wireless communication with said at least one digital audio transmitter, said at least one audio receiver comprising:

an embedded fuzzy logic detector wherein the fuzzy logic detector activates fuzzy logic rules and performs a defuzzification operation in response to a received unique user code to enhance detection of the unique user code;

a band pass filter (BPF) configured to process said transmitted DSSS signal;

a direct conversion module receiving output from said BPF and being configured to capture the correct unique user code bit sequence embedded in the received DSSS signal;

a digital demodulator adapted to process output from said direct conversion module;

a Viterbi decoder operatively coupled to said digital demodulator and generating a corresponding digital output;

a source decoder processing said digital output from said Viterbi decoder and being configured to decode the digital signal encoded by said first encoder;

an analog low pass filter;

a digital-to-analog converter (DAC) operatively coupled between said source decoder and said analog low pass filter, said analog low pass filter generating an audio output corresponding to said decoded and converted digital signal; and at least one module adapted to reproduce said amplified audio output, if the unique user code is recognized, said audio output having been wirelessly transmitted from said at least one audio source to a user without interference from other users or wireless devices when operated in a shared space containing multiple users of wireless transmission devices.

19. A wireless digital audio system, comprising:

an audio source to provide an audio signal representative of music;

a digital audio transmitter operatively coupled to said audio source, said digital audio transmitter comprising a digital modulator module configured for code division multiple access (CDMA) communication, said digital modulator module transmitting a corresponding CDMA signal with a unique user code;

said digital audio transmitter configured for digital wireless communication with at least one digital audio receiver, said digital audio receiver comprising:

an embedded fuzzy logic detector wherein the fuzzy logic detector activates fuzzy logic rules and performs a defuzzification operation in response to the received unique user code to enhance detection of the unique user code:

a digital demodulator module configured for code division multiple access (CDMA) communication;

a digital-to-analog converter (DAC) generating an audio output; and at least one module adapted to reproduce said generated audio output, if the unique user code is recognized, said audio having been wirelessly transmitted from said audio source free from interference from multiple CDMA transmission sources and other device transmitted signals operating in the wireless digital audio system spectrum to a user providing audio receiver user with independent audio in a shared space with other wireless digital audio system users, wherein each of said wireless digital audio system users utilize an independent digital transmitter and receiver.

20. A wireless digital audio system, comprising:

an audio source to provide an audio signal representative of music;

a portable digital audio transmitter operatively coupled to said audio source, said portable audio transmitter comprising:

a first encoder being configured to reduce intersymbol interference (ISI);

a second channel encoder operatively coupled to said first encoder and adapted to reduced transmission errors;

a digital modulator operatively coupled to said second channel encoder;

a differential phase shift key (DPSK) module receiving output from said digital modulator and being configured for code division multiple access (CDMA) communication, said DPSK module transmitting a corresponding CDMA signal;

an audio receiver configured for digital wireless communication with said portable digital audio transmitter and utilizing an embedded fuzzy logic detector wherein the fuzzy logic detector activates fuzzy logic rules and performs a defuzzification operation in response to the received unique user code to enhance detection of the unique user code, said audio receiver comprising:

a band pass filter (BPF) configured to process said transmitted CDMA signal;

a direct conversion module receiving output from said BPF and being configured to capture the correct bit sequence embedded in the received spread spectrum signal;

a digital demodulator adapted to process output from said direct conversion module;

a Viterbi decoder operatively coupled to said digital demodulator and generating a corresponding digital output;

a source decoder processing said digital output from said Viterbi decoder and being configured to decode the digital signal encoded by said first encoder;

an analog low pass filter;

a digital-to-analog converter (DAC) operatively coupled between said source decoder and said analog low pass filter, said analog low pass filter generating an audio output corresponding to the decoded and converted digital signal; and at least one module adapted to reproduce said generated audio output, said audio having been wirelessly transmitted from said audio source free from interference from multiple CDMA transmission sources and other device transmitted signals operating in the wireless digital audio system spectrum to a user providing a particular said audio receiver headphone user with independent audio in a shared space with other wireless digital audio system users, wherein each of said wireless digital audio system users utilize an independent portable transmitter and headphone receiver.

* * * * *

UNITED STATES PATENT AND TRADEMARK OFFICE

CERTIFICATE OF CORRECTION

PATENT NO. : 7,684,885 B2
APPLICATION NO. : 12/144729
DATED : March 23, 2010
INVENTOR(S) : C. Earl Woolfork It is certified that error appears in the above-identified patent and that said Letters Patent is hereby corrected as shown below:

Column 1, ln. 8 should read: 2003, now abandoned, -- which was a continuation-in-part of application No. 10/027,391, filed on Dec. 21, 2001, now abandoned, each -- “both” of which are incorporated herein in their entirety by reference.

Signed and Sealed this
First Day of March, 2011

David J. Kappos
*Director of the United States Patent and Trademark Office*

UNITED STATES PATENT AND TRADEMARK OFFICE

CERTIFICATE OF CORRECTION

PATENT NO. : 7,684,885 B2
APPLICATION NO. : 12/144729
DATED : March 23, 2010
INVENTOR(S) : C. Earl Woolfork It is certified that error appears in the above-identified patent and that said Letters Patent is hereby corrected as shown below:

Title page, after item (65), insert the following Related U.S. Application Data:

--Continuation of U.S. patent application No. 10/648,012, filed on August 26, 2003, which is a continuation-in-part of U.S. patent application No. 10/027,391, filed on December 21, 2001, now abandoned.--

Column 1, line 3, cancel the text beginning with "This continuation application" to "entirety by reference." in column 1, line 9, and insert the following text:

--This application is a continuation of U.S. patent application No. 10/648,012, filed on August 26, 2003, which is a continuation-in-part of U.S. patent application No. 10/027,391, filed on December 21, 2001, now abandoned, the disclosures of which are incorporated herein in their entireties by reference.--

Signed and Sealed this
Twelfth Day of April, 2011

David J. Kappos
*Director of the United States Patent and Trademark Office*